(12) United States Patent
Swanstrom et al.

(10) Patent No.: US 6,439,819 B2
(45) Date of Patent: Aug. 27, 2002

(54) PROGRESSIVELY-FORMED CLINCH NUT

(75) Inventors: Kenneth A. Swanstrom, Doylestown; Harold D. Ross, Chalfont; William P. McDonough, Collegeville, all of PA (US)

(73) Assignee: PEM Management, Inc., Wilmington, DE (US)

( * ) Notice: Subject to any disclaimer, the term of this patent is extended or adjusted under 35 U.S.C. 154(b) by 0 days.

(21) Appl. No.: 09/864,405

(22) Filed: May 25, 2001

Related U.S. Application Data

(60) Provisional application No. 60/209,628, filed on Jun. 6, 2000.

(51) Int. Cl.$^7$ ............................ F16B 37/04; F16B 37/16
(52) U.S. Cl. ...................... 411/437; 411/61; 411/183; 411/433; 470/25
(58) Field of Search .................... 411/61, 180, 171, 411/433, 437, 183; 470/20, 25

(56) References Cited

U.S. PATENT DOCUMENTS

| | | | | |
|---|---|---|---|---|
| 3,532,323 A | 10/1970 | Uhen | ........................ | 254/126 |
| 4,354,782 A | * 10/1982 | Newport | ........................ | 411/61 |
| 4,610,589 A | 9/1986 | Bredal | ........................ | 411/180 |
| 5,927,920 A | 7/1999 | Swanstrom | ........................ | 411/180 |
| 6,079,922 A | * 6/2000 | Ross et al. | ........................ | 411/437 |

FOREIGN PATENT DOCUMENTS

| | | |
|---|---|---|
| DE | 3520654 | 11/1986 |
| EP | 0027652 | 4/1981 |
| FR | 1433512 | 2/1966 |
| FR | 1444248 | 5/1966 |
| JP | 4-11284 | 2/1992 |

* cited by examiner

*Primary Examiner*—Neill Wilson
(74) *Attorney, Agent, or Firm*—Gregory J. Gore

(57) ABSTRACT

A three-sided, progressively-formed threaded fastener is comprised of a plurality of planar longitudinal faces intersecting at corner areas. Shank tabs extend downward from the bottom of each of the faces at the base of the fastener. Threaded regions along the inside surface of the planar faces are coined indentations applied during the formation of the fastener. A plurality of wedge-shaped protrusions extend downward from the corner areas at the base of the fastener. The combination of shank tabs and wedge-shaped protrusions form a clinch profile along the bottom of the fastener so that it may can be affixed to a sheet of metal by clinch fit.

8 Claims, 3 Drawing Sheets

PROGRESSIVELY-FORMED CLINCH NUT

Priority based upon provisional application serial No. 60/209,628 filed on Jun. 6, 2000, entitled "PROGRESSIVELY FORMED CLINCH NUT" is hereby claimed.

FIELD OF THE INVENTION

This invention relates to captive, internally threaded fasteners, more specifically to a clinch nut produced completely by means of a progressive stamping process. The invention is stamped and formed from flat coil stock into a fully functional internally threaded clinch nut that may be supplied in bulk form or on a reeled carrier strip.

BACKGROUND OF THE INVENTION

Progressively-formed threaded inserts, an example of which is shown in U.S. Pat. No. 5,927,920, are known. While this method of forming a threaded insert is suitable for being fully inserted into a plastic sheet, it cannot be attached to a metal panel. Other types of threaded fasteners pressed into metal panels may be joined by a process known as "clinching" whereby a cold flow of metal created during the forceful insertion process enters an undercut groove at the base of the nut. Heretofore a progressively-formed threaded part having clinch-attachment capabilities is unknown.

Such a device would be desirable since prior art clinch nuts are manufactured from a bar stock machining process or a wire forming process often requiring a costly secondary tapping step. Bar stock machining processes typically yield 1,000 pieces per hour with 70% scrap while wire-forming processes typically yield 13,000 pieces per hour with 15% scrap. There is therefore a need in the art for a clinch nut which may be inexpensively produced efficiently and with less scrap in the manufacturing process.

SUMMARY OF THE INVENTION

In order to meet the needs in the art described above, the present progressively-formed clinch nut invention has been devised. A three-sided progressively-formed threaded fastener is provided with wedge-shaped protrusions and angled side edges of shank tabs that extend from the base of the fastener. The protrusions displace sheet material into undercuts formed between the shank tabs and the base of the fastener. These structures provide the clinch attachment means when the fastener is pressed into a sheet. Except for the inclusion of these clinch features, the fastener of the present invention and its method of production is similar to that disclosed in the above-mentioned U.S. Pat. No. 5,927,920 which is included herein by reference as though fully set forth.

More specifically, the applicants have invented a threaded metal fastener comprising a tube-like channel having a polygonal cross-section and being comprised of a plurality of planar longitudinal faces intersecting at corner areas. A plurality of shank tabs extend downwardly from the bottom of each of the faces at the base of the channel. A plurality of threaded regions comprising longitudinal rows of indentations lie on the inside surface of each of the planar faces. A plurality of wedge-shaped protrusions extend downward from the corners. This forms a clinch profile at the bottom of the channel so that the fastener can be permanently affixed to a sheet of metal by clinch fit. The fastener has a triangular cross-section and is a folded strip of material with its first and second side edges meeting in abutment along a longitudinal seam. The first side edge includes a cutout and the second side edge includes a corresponding interlocking clasp tab. The seam is held together by inserting the interlocking side tab into the cutout.

The method of forming the present invention comprises providing an elongate strip of metal, cutting it into fastener blanks with arcuate indentations in a front surface with the indentations arranged in spaced longitudinal rows. The blanks each include shank tabs extending downwardly from a bottom edge. The method further includes folding the strip into a tube-like channel along longitudinal foldlines located between the rows of indentations such that wells of said indentations define chordal sections of a space corresponding to an externally-threaded member. A first edge of the blank includes a clasp, and an opposite edge of the blank includes a cutout corresponding to the shape of the tab. The clasp is inserted into the cutout to hold the edges in a fully-folded condition with the edges being in abutment along a longitudinal seam. The fastener blanks can remain connected to a common carrier portion of the strip after formation.

Not only can the present device be produced more efficiently and less expensively than a machined clinch nut, it provides many other advantages. For example, the current invention requires a smaller mounting hole when compared to the prior art resulting in closer center-line-to-edge distances and less panel distortion. Over-tightening of the mating screw in the clinch nut will not damage the threads, since the side walls flex outwardly and disengage to relieve excess torsional load on the threads prior to thread damage. Thus, neither the screw nor the clinch nut threads are damaged. Also, the present invention provides the key features of the ability to be produced in high volumes at high production rates with minimal scrap since it can be produced at rates of 21,000 pieces per hour with 15% scrap and no secondary tapping process. A portion of the scrap can be used as a carrier strip to facilitate automated installation eliminating the need for an expensive vibratory feeding bowl. Hence, a clinch nut progressively formed by die stamping as described herein can be made much less expensively. Other objects and advantages of the present invention will be apparent from the following drawings and description of the preferred embodiment.

DESCRIPTION OF THE PREFERRED EMBODIMENT

Figure 1:
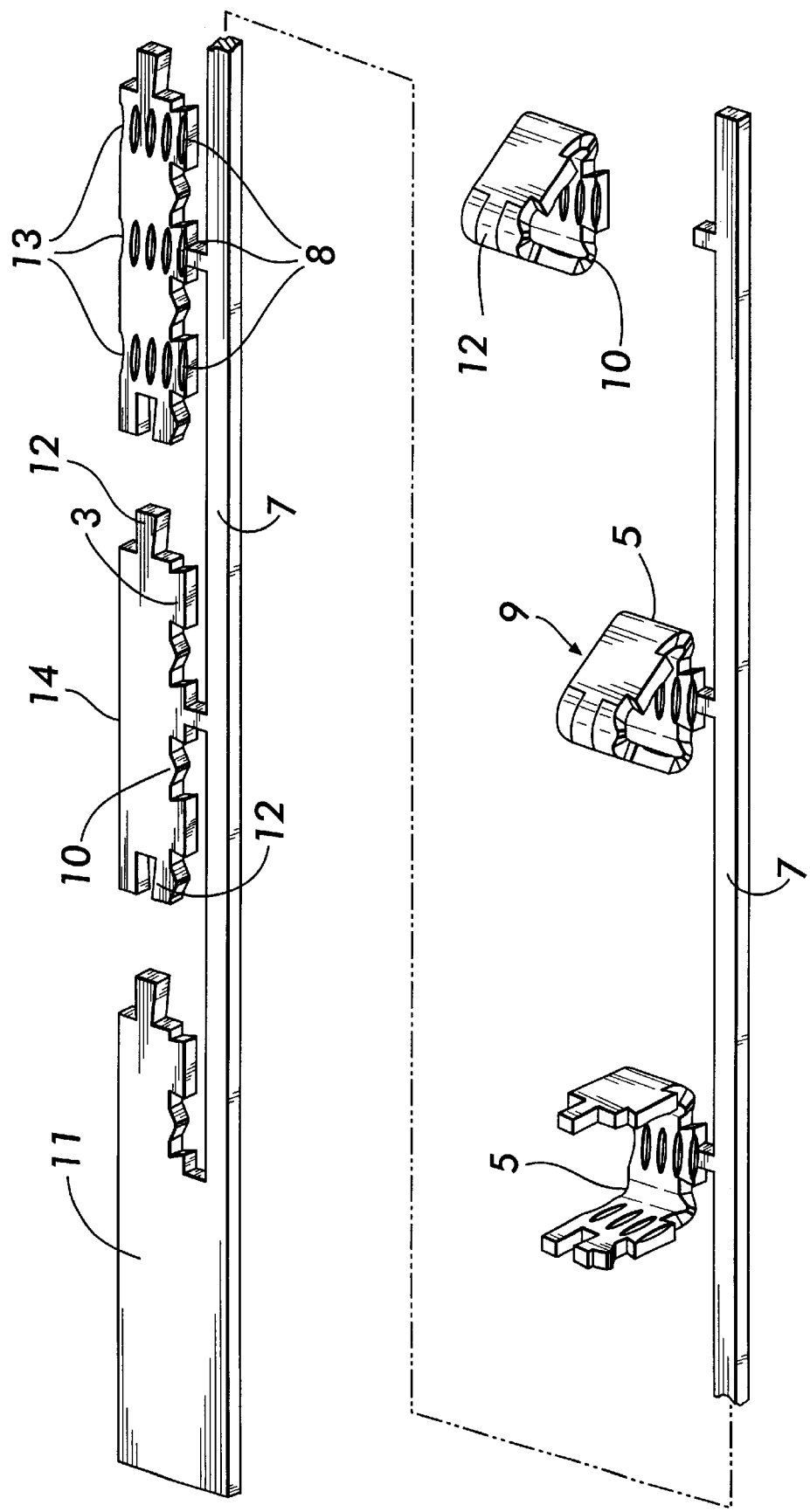
FIG. 1 is a bottom front right isometric view of the invention shown in various stages of sequential formation.

FIG. 1 shows the manufacturing progression of the invention. Flat strip stock 11 is progressively stamped, coined, and then folded into a polygonal-shaped, internally threaded, channel 9. The strip of metal is first cut into individual fastener blanks 14, each blank including a shank tab 3 extending downward from a bottom edge of the blank. Thread regions are then created in longitudinal rows divided by foldlines which bound planar faces of the completed fastener after folding. The blank further includes wedge-shaped protrusions or teeth 10 which extend from the bottom of the channel beneath each foldline between the rows of indentations. Thus, the protrusions will lie directly beneath the resultant corner areas 5 of the fastener. Each shank tab 3 is provided with angled side edges convergent upwardly so that an undercut clinch profile will be formed at the bottom of the channel between the shank tab side edges and the base of the completed fastener.

In the preferred embodiment, a three-sided fastener is formed. A three-sided polygon is desirable because it provides the largest flat area to form the threads 8 and shank tabs 3. A three-sided polygon also yields the largest bend area 5 to form the clasp tab 12 and the wedge protrusions 10. The fully formed fastener 9 can remain on a reeled carrier strip 7 to aid in orientation and presentation to an automatic installation system without the need for a vibratory bowl. The thread 8 and thread lead 13 are comprised of three coined patterns oriented to form a free running thread when formed into the final shape of the fastener 9.

Figure 2:
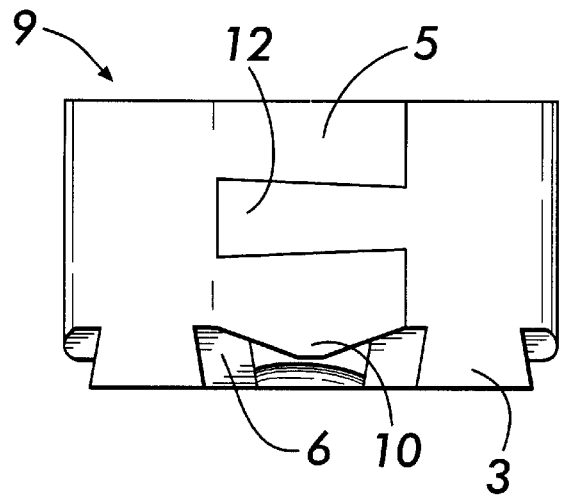
FIG. 2 is a side view of the present invention.

Referring now to FIG. 2, the fastener 9 of the invention with an undercut clinch profile 6 on shank tab 3 that provides means to permanently affix it to a sheet of metal is shown. The corner areas 5 act as longitudinal strengthening ribs which provide a means to transmit an installation force from the top of the fastener 9 to the wedge protrusions 10 just below the corners without fastener deformation. The keystone shaped clasp tab 12 is designed to withstand the compression loads of the installation force and the tensile/expansion loads resultant of the clamp forces created by a mating screw. The clasp 12 also permits heat treating the fastener 9 without deformation.

Figure 3:
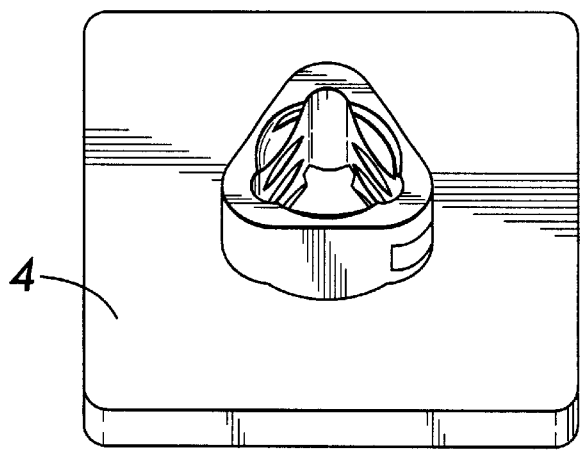
FIG. 3 is a top perspective view of the present invention installed in a sheet.
Figure 4:
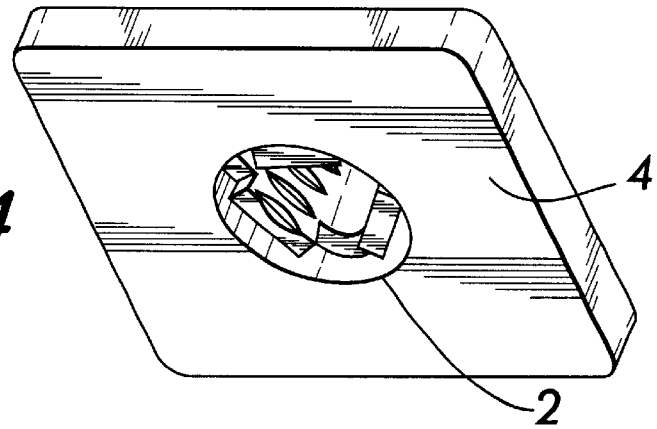
FIG. 4 is a bottom perspective view of the combination shown in FIG. 3.

FIGS. 3 and 4 show the fastener installed into a round hole 2 of sheet 4.

Figure 5:
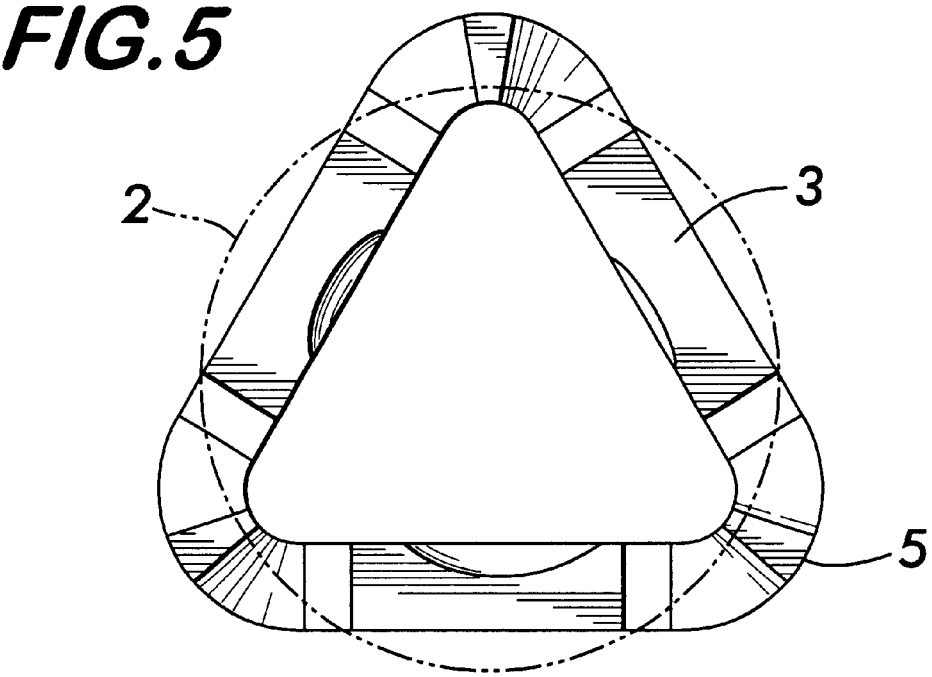
FIG. 5 is a bottom view aligned with an insertion hole shown in dotted lines.
Figure 6:
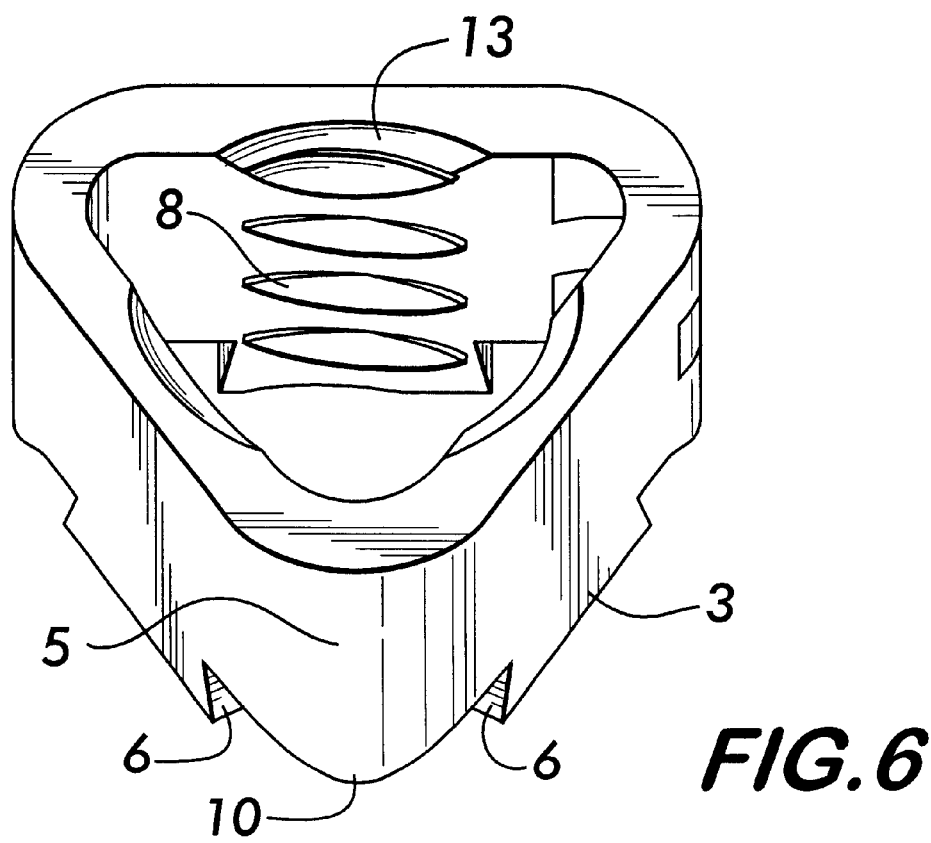
FIG. 6 is a top perspective view of the invention.

FIG. 5 shows in dotted lines a hole 2 sized to the tangent points of the three shank tabs 3. The minimum width of the shank tabs 3 is dictated by the width of the thread impression 8 as shown in FIG. 6. The shank tab width can be optimized to result in a smaller hole than that required by traditional clinch nuts. Referring further to FIG. 6, the fastener also includes thread lead 13 at the top of the fastener.

The fastener of the present invention is installed into a metal sheet, by a simple pressing operation well-known in applying fasteners to sheets by clinch fit. As the present invention is pressed into the sheet, the sheet material is displaced by the wedge protrusions 10 which form teeth located under the three corner areas 5 of the fastener that bite into the sheet. This forceful deformation of the sheet by the protrusions displaces material and forces it into the undercuts 6 between the bottom edge of the fastener formed by the upwardly-convergent angled side edges of the shank tabs 3. The cold flow of the material permanently locks the fastener in place. Referring back to FIG. 5, it will be apparent that the corners are the areas of greatest diameter of the fastener and larger than the hole size while the shank tabs will lie within the diameter of the hole.

It will be understood by those of ordinary skill in the art that the main object of the present invention, to include structures which produce a clinch attachment structure along the mouth of a progressively-formed folded insert which may be produced at high production rates with a minimum of scrap, has been achieved. Other uses, advantages, and modifications to the present invention will be readily obvious to those of skill in the art, however, the present invention shall be limited only by the following claims and their legal equivalents.

What is claimed is:

1. A threaded metal fastener, comprising:
   a tube-like channel having a polygonal cross-section and being comprised of a plurality of planar longitudinal faces intersecting at corners;
   a shank tab located at the bottom of each of said faces and extending axially downward from a base of said channel;
   a plurality of thread regions comprising longitudinal rows of indentations on an inside surface of each of said planar faces;
   a downwardly convergent wedge-shaped protrusion extending from the bottom of said channel beneath each corner; and
   said shank tabs each having angled side edges convergent upwardly whereby an undercut clinch profile is formed at the bottom of the channel, said profile providing means to permanently affix the fastener to a sheet of metal by clinch fit.

2. The fastener of claim 1, wherein said cross-section is triangular.

3. The fastener of claim 1, further described as a folded strip of material having first and second side edges which meet in abutment along a longitudinal seam.

4. The fastener of claim 3, wherein said first side edge includes a cutout and said second side edge includes an interlocking clasp tab corresponding to said cutout whereby said seam is held together by inserting said clasp tab into said cutout.

5. The method of forming a threaded metal clinch nut, having a tube-like, elongate channel of polygonal cross-section and a plurality of substantially planar faces which meet at corners, comprising the steps of:
   providing an elongate strip of metal;
   cutting said strip into fastener blanks with arcuate indentations in a front surface thereof said indentations arranged in spaced longitudinal rows and said blanks each including a shank tab extending downwardly from a bottom edge thereof beneath each row of indentations; and
   folding said strip into a tube-like channel along longitudinal foldlines located between said rows of indentations such that wells of said indentations define chordal sections of a space corresponding to an externally-threaded member.

6. The method of forming a threaded insert of claim 5, wherein a first edge of said blank includes a clasp tab, and an opposite edge of said blank includes a cutout corresponding to the shape of said tab.

7. The method of forming a threaded insert of claim 6, further including the step of inserting said clasp tab into said cutout to hold said edges in a fully-folded condition, said edges being in abutment along a longitudinal seam.

8. The method of forming a threaded insert of claim 5, wherein all of said fastener blanks remain connected to a common carrier portion of said strip after formation.

* * * * *